United States Patent
Kehl et al.

(10) Patent No.: US 11,010,592 B2
(45) Date of Patent: May 18, 2021

(54) SYSTEM AND METHOD FOR LIFTING 3D REPRESENTATIONS FROM MONOCULAR IMAGES

(71) Applicant: Toyota Research Institute, Inc., Los Altos, CA (US)

(72) Inventors: Wadim Kehl, San Francisco, CA (US); Fabian Manhardt, Lam (DE)

(73) Assignee: Toyota Research Institute, Inc., Los Altos, CA (US)

(*) Notice: Subject to any disclaimer, the term of this patent is extended or adjusted under 35 U.S.C. 154(b) by 101 days.

(21) Appl. No.: 16/269,172

(22) Filed: Feb. 6, 2019

(65) Prior Publication Data

US 2020/0160033 A1 May 21, 2020

Related U.S. Application Data

(60) Provisional application No. 62/704,033, filed on Nov. 15, 2018.

(51) Int. Cl.
*G06K 9/00* (2006.01)
*G06T 7/73* (2017.01)
(Continued)

(52) U.S. Cl.
CPC ..... *G06K 9/00208* (2013.01); *G06K 9/00805* (2013.01); *G06T 7/11* (2017.01);
(Continued)

(58) Field of Classification Search
CPC .. G06T 7/73; G06T 7/174; G06T 7/55; G06T 7/11; G06T 2207/20081;
(Continued)

(56) References Cited

U.S. PATENT DOCUMENTS 9,053,562 B1 6/2015 Rabin et al.
9,558,584 B1 1/2017 Lo et al.
(Continued)

OTHER PUBLICATIONS

Kundu, et al., "3D-RCNN: Instance-level 3D Object Reconstruction via Render-and Compare," CVPR, pp. 3559-3568 (2018).
(Continued)

*Primary Examiner* — Amara Abdi
(74) *Attorney, Agent, or Firm* — Christopher G. Darrow; Darrow Mustafa PC (57) ABSTRACT

In one embodiment, example systems and methods relate to a manner of generating 3D representations from monocular 2D images. A monocular 2D image is captured by a camera. The 2D image is processed to create one or more feature maps. The features may include depth features, or object labels, for example. Based on the image and the feature map, regions-of-interest corresponding to vehicles in the image are determined. For each region-of-interest a lifting function is applied to the region-of-interest to determine values such as height and width, camera distance, and rotation. The determined values are used to create an eight-point box that is a 3D representation of the vehicle depicted by the region-of-interest. The 3D representation can be used for a variety of purposes such as route planning, object avoidance, or as training data, for example.

17 Claims, 5 Drawing Sheets

(51) Int. Cl.
  *G06T 7/174* (2017.01)
  *G06T 7/55* (2017.01)
  *G06T 7/11* (2017.01)
(52) U.S. Cl.
  CPC .............. *G06T 7/174* (2017.01); *G06T 7/55* (2017.01); *G06T 7/73* (2017.01); *G06T 2207/20081* (2013.01); *G06T 2207/30261* (2013.01)
(58) Field of Classification Search
  CPC ...... G06T 2207/30261; G06K 9/00208; G06K 9/00805
  See application file for complete search history.

(56) References Cited

U.S. PATENT DOCUMENTS

| | | |
|---|---|---|
| 2013/0142390 A1 | 6/2013 | Othmezouri et al. |
| 2014/0270484 A1 | 9/2014 | Chandraker et al. |
| 2015/0371095 A1* | 12/2015 | Hartmann ............ G06K 9/6267 348/148 |
| 2018/0137642 A1* | 5/2018 | Malisiewicz ...... G06K 9/00201 |
| 2019/0096086 A1* | 3/2019 | Xu ...................... G06K 9/00791 |
| 2019/0266784 A1* | 8/2019 | Singh .................... G06F 9/3877 |
| 2019/0361454 A1* | 11/2019 | Zeng ................. B60W 50/0098 |
| 2020/0066036 A1* | 2/2020 | Choi ........................ G06T 7/75 |

OTHER PUBLICATIONS

Kanazawa, et al., "Learning Category-Specific Mesh Reconstruction from Image Collections," Computer Vision Foundation pp. 1-16 (2018).

* cited by examiner

SYSTEM AND METHOD FOR LIFTING 3D REPRESENTATIONS FROM MONOCULAR IMAGES

CROSS-REFERENCE TO RELATED APPLICATIONS

This application claims priority to U.S. Provisional Patent Application Ser. No. 62/704,033 and filed on Nov. 15, 2018. The disclosure of which is hereby incorporated by reference in its entirety.

TECHNICAL FIELD

The subject matter described herein relates, in general, to systems and methods for lifting 3D representations from monocular images, and, in particular, to training a lifting function to generate 3D representations from regions-of-interest in monocular images.

BACKGROUND

Currently, may vehicles, such as autonomous cars, include multiple cameras that capture images of the surroundings of a vehicle. For example, an autonomous vehicle may have a camera that captures the environment in the front of the vehicle, a camera that captures the environment in the rear of the vehicle, a camera that captures the environment to the left of the vehicle, and a camera that captures the environment to the right of the vehicle.

As may be appreciated, the images captured by such cameras are two-dimensional images, and more specifically monocular images. While such monocular images can provide useful information to the autonomous vehicle, in some scenarios it may be desirable to extract three dimensional information about one or more objects in the images.

For example, a two-dimensional image may show one or more objects such as other vehicles in front of the vehicle. In order for the vehicle to determine the best way to avoid the vehicles shown in the two-dimensional image, it would be useful for the vehicle to have three-dimensional information about the vehicles shown in the image such as their dimensions and orientation, for example.

Furthermore, extracting three-dimensional information from two-dimensional images may be useful for a variety of other fields and technologies that commonly use two-dimensional images. These may include security (e.g., generating three-dimensional representations of intruders or other objects captured in security footage), film making, and the generation of training data.

SUMMARY

In one embodiment, example systems and methods relate to a manner of generating 3D representations from monocular 2D images. A monocular 2D image is captured by a camera. The 2D image is processed to create one or more feature maps. The features may include depth features, or object labels, for example. Based on the image and the feature map, regions-of-interest corresponding to vehicles in the image are determined. For each region-of-interest a lifting function is applied to the region-of-interest to determine values such as height and width, camera distance, and rotation. The determined values are used to create an eight-point box that is a 3D representation of the vehicle depicted by the region-of-interest. The 3D representation can be used for a variety of purposes such as route planning, object avoidance, or as training data, for example.

In one embodiment, a system for generating 3D representations from images is provided. The system includes one or more processors and a memory communicably coupled to the one or more processors. The memory storing an image module including instructions that when executed by the one or more processors cause the one or more processors to capture an image. The memory further storing a feature module including instructions that when executed by the one or more processors cause the one or more processors to generate one or more feature maps for the captured image. The memory further storing a feature module including instructions that when executed by the one or more processors cause the one or more processors to generate one or more feature maps for the captured image. The memory further storing a region-of-interest module including instructions that when executed by the one or more processors cause the one or more processors to determine one or more regions-of-interests in the captured image based in part on the one or more feature maps. The memory further storing a lifting module including instructions that when executed by the one or more processors cause the one or more processors to for each region-of-interest, generate a 3D representation based on the region-of-interest and the one or more feature maps.

Embodiments may include some or all of the following features. Each region-of-interest may correspond to a vehicle. The memory may further store a training module including instructions that when executed by the one or more processors cause the one or more processors to generate training data from the generated 3D representations. Each 3D representation may be a 3D box. Each 3D representation may be generated using a lifting function. The memory may further store a loss module including instructions that when executed by the one or more processors cause the one or more processors to calculate a loss for one or more the 3D representations. The loss module may further include instructions that when executed by the one or more processors cause the one or more processors to train the lifting function using the calculated loss. Generating a 3D representation based on the region-of-interest and the one or more feature maps may include: calculating a height and width for the region-of-interest from the one or more feature maps; calculating a geometric center for the region-of-interest from the one or more feature maps; calculating a camera distance for the region-of-interest from the one or more feature maps; calculating a rotation for the region-of-interest from the one or more feature maps; and generating the 3D representation of the region-of-interest from one or more of the calculated height and width, the calculated geometric center, the calculated camera distance, and the calculated rotation.

In one embodiment, a method for generating 3D representations from images is provided. The method includes: receiving an image and one or more feature maps for the image; determining one or more regions-of-interest in the image based in part of the image and the one or more feature maps; for each region-of-interest, generating a 3D representation based on the region-of-interest and the one or more feature maps using a lifting function; calculating a loss for one or more of the generated 3D representations; and training the lifting function using the calculated loss.

Embodiments may include some or all of the following features. Each region-of-interest may correspond to a vehicle. The method may further include generating training data from the generated 3D representation. Each 3D representation may be a 3D box. Generating a 3D representation based on the region-of-interest and the one or more feature maps using the lifting function may include: calculating a height and width for the region-of-interest from the one or more feature maps; calculating a geometric center for the region-of-interest from the one or more feature maps; calculating a camera distance for the region-of-interest from the one or more feature maps; calculating a rotation for the region-of-interest from the one or more feature maps; and generating the 3D representation of the region-of-interest from one or more of the calculated height and width, the calculated geometric center, the calculated camera distance, and the calculated rotation. The image may be a 2D monocular image.

In one embodiment, a non-transitory computer-readable medium for generating 3D representations from images is provided. The non-transitory computer-readable medium includes instructions that when executed by one or more processors cause the one or more processors to: capture an image; generate one or more feature maps for the captured image; determine one or more regions-of-interest in the image based in part of the image and the one or more feature maps; and for each region-of-interest, generate a 3D representation based on the region-of-interest and the one or more feature maps using a lifting function.

Embodiments may include some or all of the following features. Each region-of-interest may correspond to a vehicle. Each 3D representation may be a 3D box. Generating a 3D representation based on the region-of-interest and the one or more feature maps may include: calculating a height and width for the region-of-interest from the one or more feature maps; calculating a geometric center for the region-of-interest from the one or more feature maps; calculating a camera distance for the region-of-interest from the one or more feature maps; calculating a rotation for the region-of-interest from the one or more feature maps; and generating the 3D representation of the region-of-interest from one or more of the calculated height and width, the calculated geometric center, the calculated camera distance, and the calculated rotation. The image may be a 3D monocular image.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with generating three-dimensional ("3D") representations of regions-of-interest in monocular two-dimensional ("2D") images are disclosed. As described above, vehicles such as the vehicle 100 of FIG. 1 frequently include cameras that generate 2D monocular images. These images may be used for purposes of hazard avoidance or navigation. Typically, the vehicle 100 processes the images to identify regions-of-interest in the images that may correspond to hazards such as other vehicles and pedestrians, or to identify regions-of-interest that may correspond to street signs or traffic lights. While such regions-of-interest provide useful information, because they are 2D rather than 3D, they are less useful than the equivalent 3D representation.

Accordingly, to help generate 3D representations of regions-of-interest from 2D monocular images, a 3D representation system is provided. In some embodiments, the 3D representation system uses a lifting function to generate 3D representations from 2D regions-of-interest in a 2D monocular image. The lifting function may generate a 3D bounding box for a region-of-interest that may express the dimensions and orientation of the particular object depicted in the region-of-interest. The lifting function may be trained using a loss function that calculates the loss between the 3D bounding box generated for a region-of-interest and a known ground truth box for the region-of-interest. The 3D representations may be used for a variety of purposes such as hazard detection and avoidance in the vehicle 100, or for generating training data to train one or more classifiers, for example.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Figure 1:
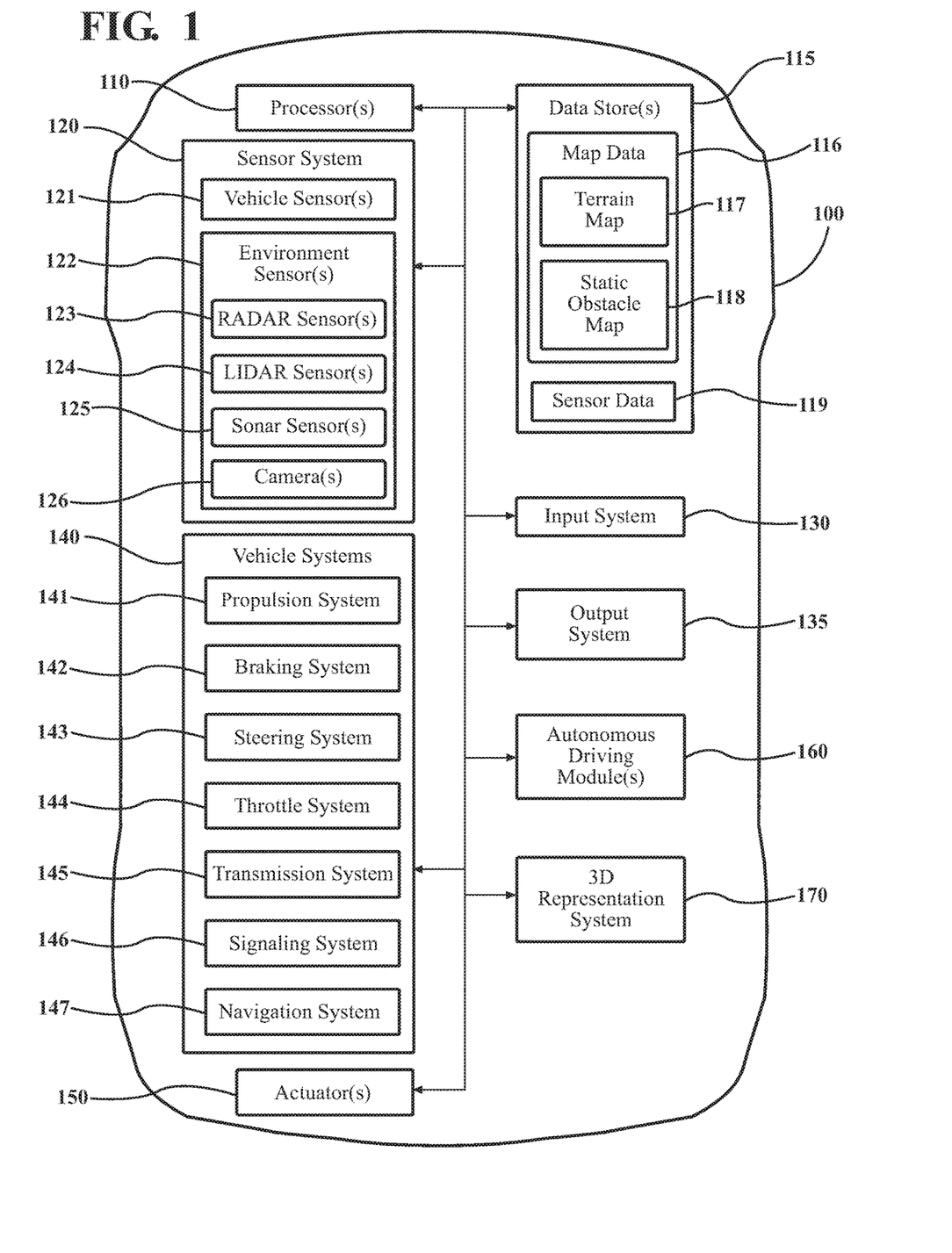
FIG. 1 illustrates one embodiment of a 3D representation system that is associated with generating training data including labeled synthetic images.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a 3D representation system 170 that is implemented to perform methods and other functions as disclosed herein relating to determining optimal paths for the vehicle 100. The noted functions and methods will become more apparent with a further discussion of the figures.

Figure 2:
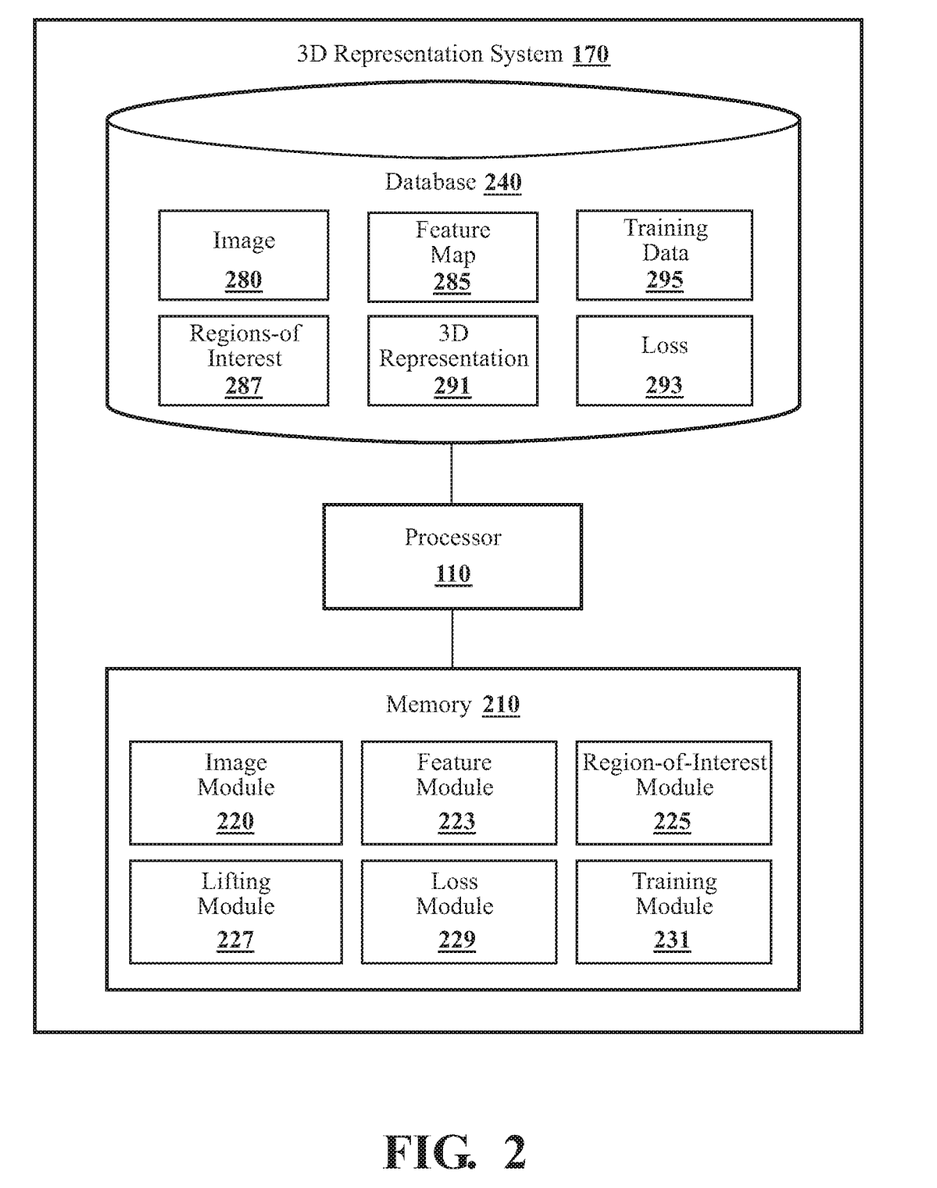
FIG. 2 illustrates one example of a 3D representation system as embodied herein.

With reference to FIG. 2, one embodiment of the 3D representation system 170 of FIG. 1 is further illustrated. The 3D representation system 170 is shown as including a processor 110 from the vehicle 100 of FIG. 1. Accordingly, the processor 110 may be a part of the 3D representation system 170, the 3D representation system 170 may include a separate processor from the processor 110 of the vehicle 100 or the 3D representation system 170 may access the processor 110 through a data bus or another communication path. It should be appreciated, that while the 3D representation system 170 is illustrated as being a single contained system, in various embodiments, the 3D representation system 170 is a distributed system that is comprised of components that can be provided as a centralized server, a cloud-based service, and so on. Moreover, the 3D representation system 170 described herein is not limited to vehicle-based implementations, but may be implemented using any general purpose computing device.

In one embodiment, the 3D representation system 170 includes a memory 210 that stores an image module 220, a feature module 223, a region-of-interest module 225, a lifting module 227, a loss module 229, and a training module 231. More or fewer modules may be supported. The memory 210 is a random-access memory (RAM), read-only memory (ROM), a hard-disk drive, a flash memory, or other suitable memory for storing the modules 220, 223, 225, 227, 229, and 231. The modules 220, 223, 225, 227, 229, and 231 are, for example, computer-readable instructions that when executed by the processor 110 cause the processor 110 to perform the various functions disclosed herein. Moreover, as previously noted, in various embodiments, one or more aspects of the 3D representation system 170 are implemented as cloud-based services, and so on. Thus, one or more modules of the 3D representation system 170 may be located remotely from other components and may be implemented in a distributed manner.

Furthermore, in one embodiment, the 3D representation system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220, 223, 225, 227, 229, and 231 in executing various functions. In one embodiment, the database 240 includes an image 280 along with, for example, other information that is used and/or generated by the modules 220, 223, 225, 227, 229, and 231 such as one or more features map 285, regions-of-interest 287, 3D representations 291, training data 295, and loss 293. Of course, in further embodiments, the various information may be stored within the memory 210 or another suitable location.

The image module 220 may be configured to capture one or more images 280. The image 280 may be a monocular image 280 and may be captured by the image module 220 using one or more sensors of the sensor system 120 of the vehicle 100, such as the camera 126. Other types of sensors may be supported. The captured image 280 may be an RGB image 280, although other image types and/or formats may be supported. Depending on the embodiment, the image module 220 may receive the image 280 from a camera 126 associated with a different vehicle 100, or from a different computing device such as a smart phone, for example.

The feature module 223 may be configured to generate one or more feature maps 285 for the image 280. Depending on the embodiment, each feature map 285 may be a pixel-level feature map 285, and may associate labels with each pixel of the image 280. In one example, the feature map 285 is a depth map, and may include an estimated depth for each pixel of the image 280. The depth estimated for each pixel may be an estimate of the distance from the camera that took the image 280 to the object or feature of the image 280 that includes the pixel. In another example, the feature map 285 may identify the object or feature of the image 280 that is associated with a pixel of the image 280. For example, the feature map 285 may identify pixels of the image 280 that are associated with objects such as tires, faces, animals, words, etc. Other types of feature map 285 may be supported. Any method or technique for generating feature maps 285 for an image 280 may be used.

The region-of-interest module 225 may determine one or more regions-of-interest 287 in the image 280. The region-of-interest module 225 may determine the one or more regions-of-interest 287 using the pixels of the image 280 and one or more of the feature maps 285 generated by the feature module 223. The regions-of-interest 287 may be regions of the image 280 that depict vehicles. Other types of objects may be depicted in each region-of-interest 287.

Each region-of-interest 287 generated or determined by the region-of-interest module 225 may include a section of pixels from the image 280. In addition, each pixel of the region-of-interest 287 may be associated with information from the one or more feature maps 285, such as depth information. In some implementations, the region-of-interest module 225 may use an application such as RoIAlign to determine the regions-of-interest 287 in the image 280. However, any method or technique known in the art for determining regions-of-interest 287 may be used.

The lifting module 227 may be configured to generate 3D representations 291 of the determined regions-of-interest 287. In some embodiments, the lifting module 227 may generate a 3D representation 291 using a lifting function or a lifting map that internally regresses components of the 3D representation 291 from the region-of-interest 287. Depending on the embodiment, the 3D representation 291 of the region-of-interest 287 may be a box that is made up of eight ordered 3D points. The components of the 3D representation lifted from the region-of-interest 287 may include, but are not limited to, height and width, geometric center, camera distance, and rotation.

More specifically, the lifting function may be a mapping $F: \mathbb{R} \to \mathbb{R}^{8\times 3}$ from a 2D region-of-interest X to a 3D box $B:=\{B_1, \ldots, B_8\}$ of eight ordered 3D points (i.e., the 3D representation 291). Depending on the embodiment, the rotation of the 3D representation 291 may be encoded as a 4D quaternion and the translation as a projected 2D object centroid together with the associated depth.

Given the region-of-interest 287 X, the lifting function F(X) may run the application RoIAlign at the position of the region-of-interest 287 in the image 280 (including feature maps 285), followed by separate prediction heads to recover the various components of the 3D representation 291 in the region-of-interest 287. These components may include, but are not limited to, rotation q, 2D centroid (i.e., geometric center), depth z (i.e., camera depth), and metric extends (w, h, l). From these components, the lifting module 227 may construct the eight corners of the 3D box $B_i$ (i.e., the 3D representation 291 as:

$$B_i := q \cdot \begin{pmatrix} \pm w/2 \\ \pm h/2 \\ \pm l/2 \end{pmatrix} \cdot q^{-1} + K^{-1} \begin{pmatrix} x \cdot z \\ y \cdot z \\ z \end{pmatrix}$$

In the above formula, $K^{-1}$ is the inverse camera intrinsics. The lifting module 227 may build the points $B_i$ in a defined order to preserve absolute orientation. Any order may be used. The lifting module 227 may use the above formula to generate 3D representations 291 from each of the regions-of-interest 287.

The loss module 229 may be configured to calculate a loss 293 for each 3D representation 291. As may be appreciated, when estimating a 3D representation 291 from a monocular image 280, small deviations in pixel space can introduce large errors in the 3D representation 291. Penalizing each term of the 3D representation 291 to correct for these errors may lead to volatile optimization and may be prone to suboptimal local minima. To account for these errors, the loss module 229 may calculate the loss 293 for a 3D representation 291. The calculated loss 293 may be used by the loss module 229 to adjust the 3D representation 291, or to train the lifting function used by the lifting module 227, for example.

In some embodiments, the loss module 229 may calculate the loss for a 3D representation 291 by comparing the box B with a ground truth box $B^* := \{B^*_1, \ldots, B^*_8\}$ associated with the same region-of-interest 287 X that the box B was generated from. The loss module 229 may calculate the loss 293 as the mean over the 8 corner distances in metric space according to the following formula:

$$L(F(X), B^*) = \frac{1}{8} \sum_{i \in (1\ldots 8)} \|F(X)_i - B^*_i\|$$

The lifting module 220 may be further configured to predict a shape or mesh for the 3D representations 291. In order to train the lifting module 220 to predict the shape for a 3D representation 291 from the associated region-of-interest 287 the lifting module 220 may, for a generated shape s for a region-of-interest 287, compute the loss 293 between the computed shape s and the known ground truth shape s* using the following formula:

$$L_{shape}(s, s^*) = \arccos(2\langle s, s^* \rangle^2 1)$$

The lifting module 220 may be further configured to generate a texture for each 3D representation 291. As may be appreciated, the 3D representation 291, specifically the 8 point box, includes the absolute scale and 6D pose. Accordingly, in some embodiments, the lifting module 220 may generate a texture for the 3D representation 291 by projecting each camera-facing vertex of the predicted shape or mesh into the image 280, and assigning the corresponding pixel values of the image 280 to the projected vertices. To account for the non-camera facing vertices, the lifting module 220 may assign pixels to these vertices based on the symmetry of the 3D representation 291, for example.

The training module 231 may be configured to generate training data 295 from the 3D representations 291 generated by the lifting module 227. In some implementations, the training data 295 may be labeled training data 295. Labeled training data 295 may include a label that describes each of the 3D representations 291 extracted or generated from the regions-of-interest 287 in the image 280. Depending on the embodiment, the labels for each of the 3D representations 291 may be taken from the one or more feature maps 285 associated with the image 280, or may be manually provided by a human labeler, for example.

The training module 231 may use the training data 295 to train a variety of classifiers, or other learning functions. For example, if the training data 295 includes images 280 with 3D representations 291 of vehicles, the training data 295 may be used to train a classifier to recognize vehicles. In another example, if the training data 295 includes images 280 with 3D representations 291 of people, the training data 295 may be used to train a classifier to recognize humans.

Figure 3:
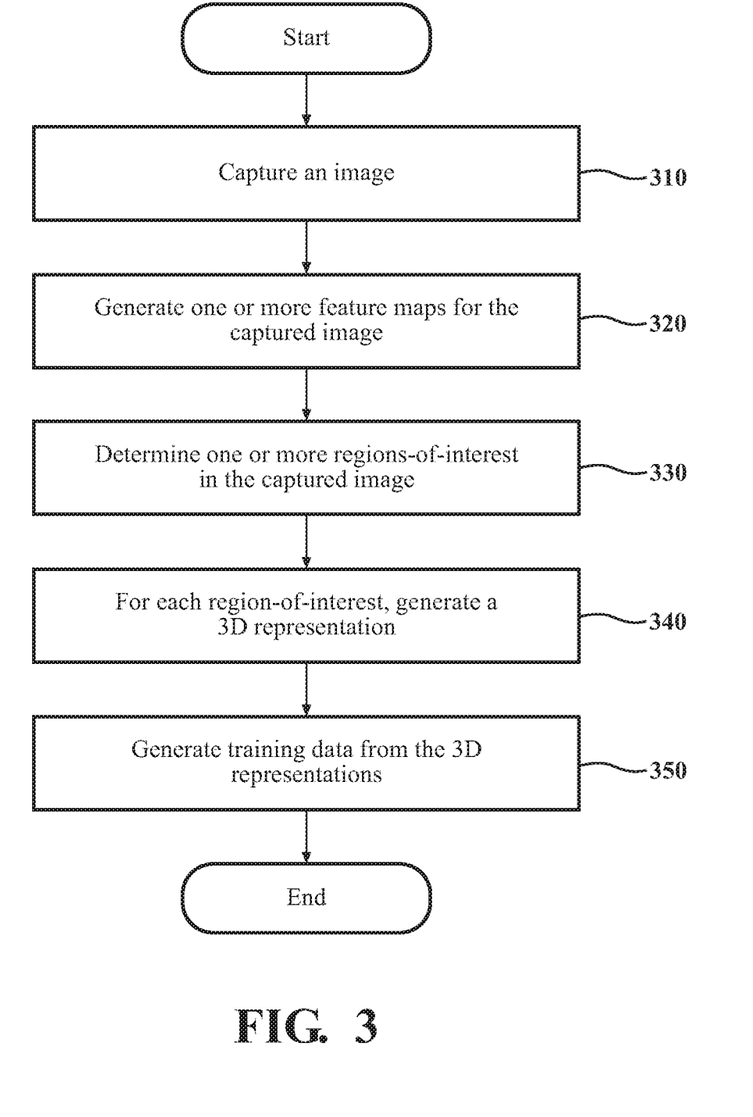
FIG. 3 illustrates a flowchart of a method that is associated with generating 3D representations from regions-of-interest in images.

Additional aspects of generating 3D representations 291 from 2D images 180 will be discussed in relation to FIG. 3. FIG. 3 illustrates a flowchart of a method 300 that is associated with generating 3D representations 291 from regions-of-interest 287 in images 280. The method 300 will be discussed from the perspective of the 3D representation system 170 of FIGS. 1 and 2. While the method 300 is discussed in combination with the 3D representation system 170, it should be appreciated that the method 300 is not limited to being implemented within the 3D representation system 170 but is instead one example of a system that may implement the method 300.

At 310, the image module 220 captures an image 280. The image module 220 may capture the image 280 using a camera 126 associated with the vehicle 100. The image 280 may be a monocular image 280. The image 280 may depict a scene in front of the vehicle 100 and may include one or more other vehicles. Continuing to FIG. 5, an example image 510 is illustrated. As shown, the image 510 depicts a vehicle 505.

Returning to FIG. 3, at 320, the feature module 223 generates one or more feature maps 285. The feature maps 285 may include a depth map that indicates a depth for each pixel of the image 280. Other types of feature maps 285 may be supported.

At 330, the region-of-interest module 225 determines one or more regions-of-interest 287 in the image 280. The region-of-interest module 225 may determine the one or more regions-of-interest 287 using the one or more feature maps 285. Depending on the embodiment, each region-of-interest 287 may be a region of pixels in the image 280 and may depict a vehicle 100. Any method for determining regions-of-interest 287 in an image 280 may be used. Returning to FIG. 5, the region-of-interest module 225 has determined a region-of-interest 515 corresponding to the vehicle 505 depicted in the image 510. The region-of-interest 515 is illustrated in the image 510 using a dashed oval.

Returning to FIG. 3, at 340, the lifting module 227 generates a 3D representation 291 for each region-of-interest 287. The lifting module 227 may generate each 3D representation 291 using a lifting function that was previously trained to generate 3D representations 291 from regions-of-interest 287. Each 3D representation 291 may be an 8 point box and may have been generated by the lifting module 227 by calculating one or more of a height and width for the associated region-of-interest 287, a geometric center for the associated region-of-interest 287, a camera distance for the associated region-of-interest 287, and a rotation for the associated region-of-interest 287.

In addition, in some embodiments, the lifting module 227 may generate a mesh shape and a texture for each 3D representation 291. With respect to the mesh shape, the lifting module 227 may have been trained to determine shapes for objects such as vehicles from regions-of-interest 287 in images 280. With respect to the texture, the lifting module 227 may project some or all of the pixels of the region-of-interest onto the shape of the 3D representation 291. Any method for determining shapes and textures for 3D representations 291 may be used.

Figure 6:
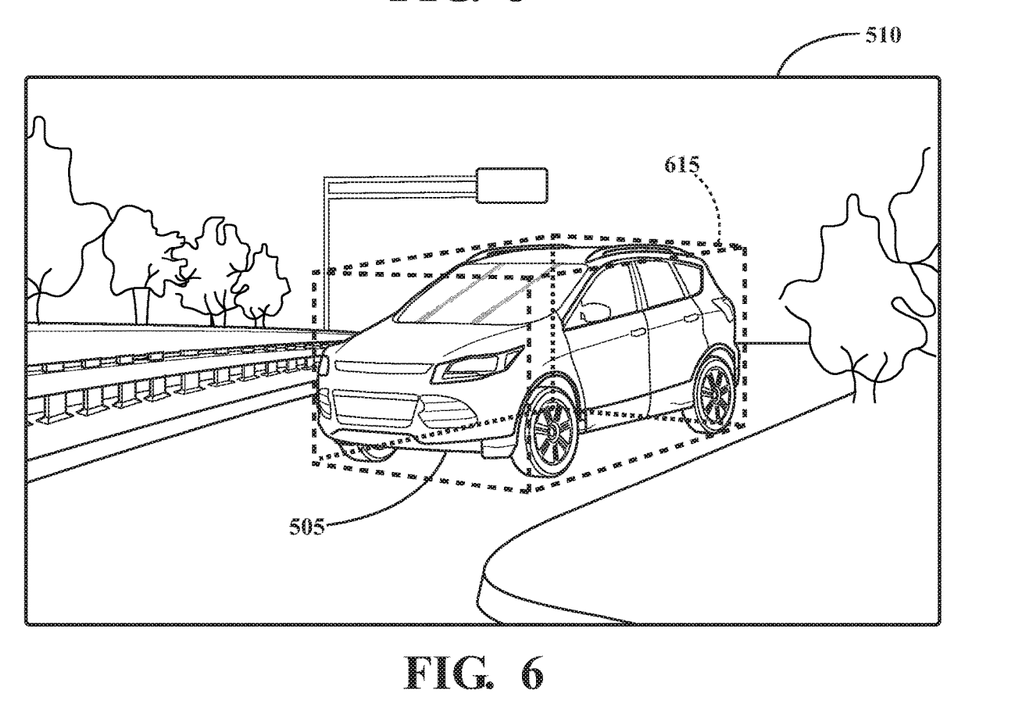
FIG. 6 illustrates an example image including a 3D representation corresponding to a region-of-interest.

Continuing to FIG. 6, the lifting module 225 has generated a 3D representation 615 corresponding to the vehicle 505 (and the region-of-interest 515) depicted in the image 510. The 3D representation 617 is illustrated in the image 510 using the dashed 3D box. As shown, the box has eight points.

Returning to FIG. 3, at 350, the training module 231 may generate training data 295 from the generated 3D representations 291 for each of the regions-of-interest 287. The training data 295 may be used to train one or more classifiers, for example. The 3D representations 291 in the training data 295 may be labeled. The training module 231 may generate the labels for each 3D representation 291 from information from the one or more feature maps 285 associated with the 3D representation 291. Other methods for labeling training data 295 may be used.

Figure 4:
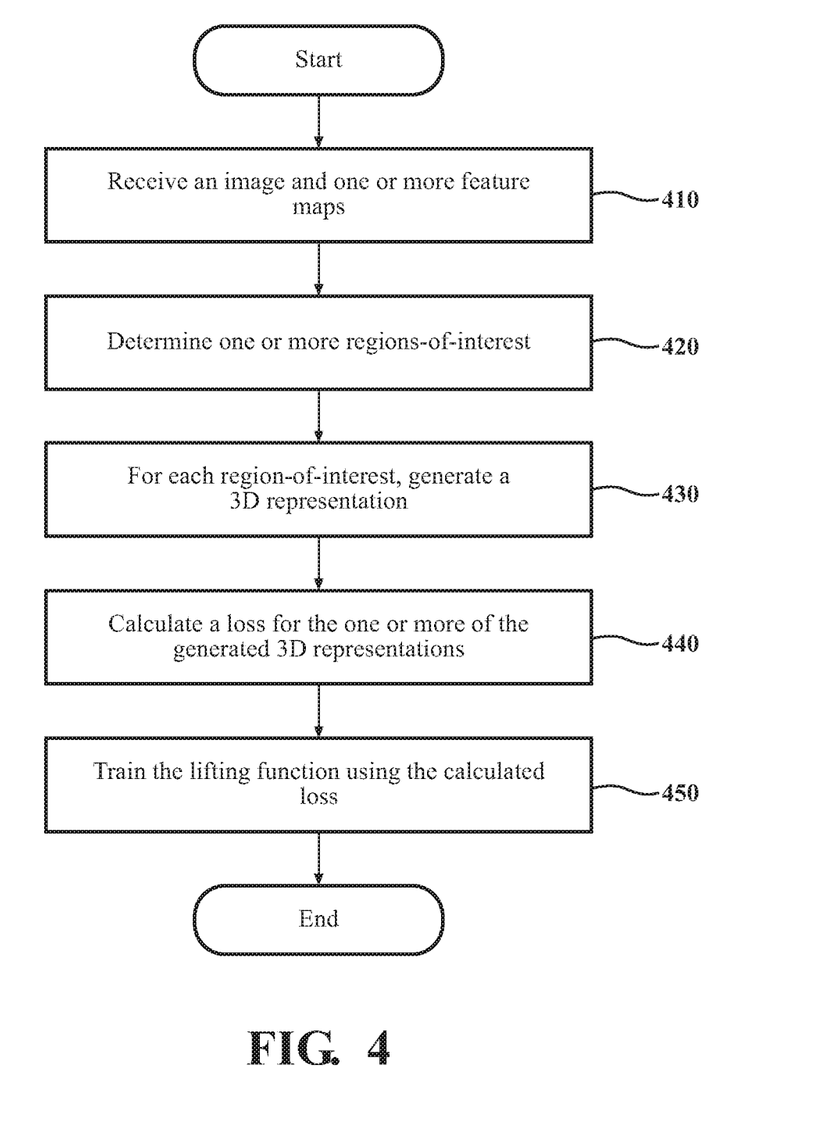
FIG. 4 illustrates a flowchart of a method that is associated with training a lifting function using calculated loss.
Figure 5:
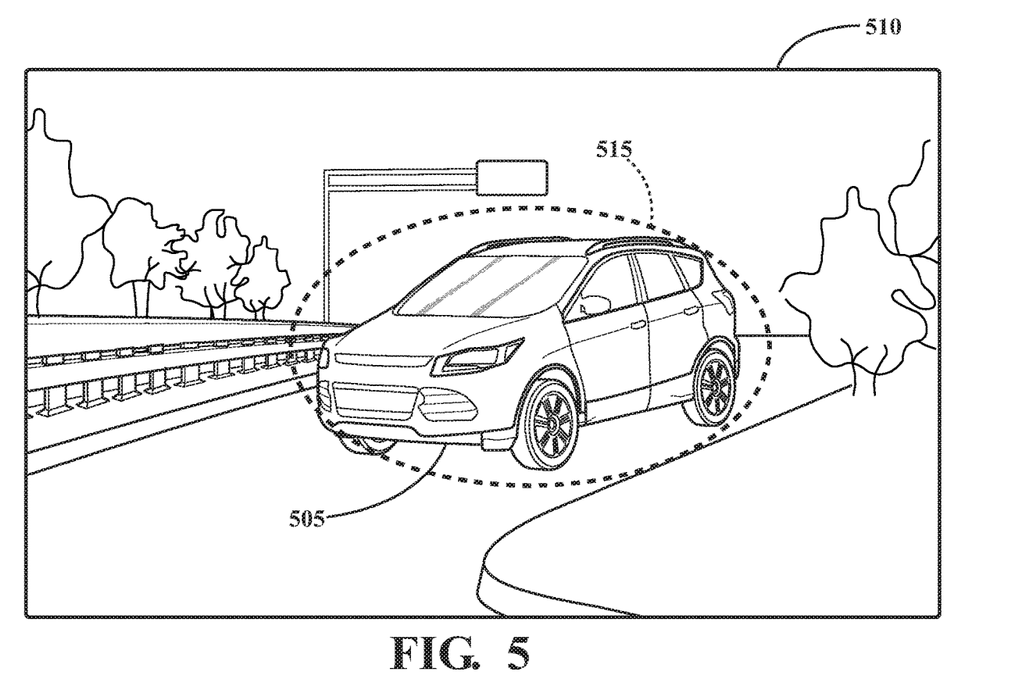
FIG. 5 illustrates an example image including a region-of-interest.

Additional aspects of generating 3D representations from regions-of-interests in 2d monocular images will be discussed in relation to FIG. 4. FIG. 4 illustrates a flowchart of a method 400 that is associated with training a lifting function using calculated loss. The method 400 will be discussed from the perspective of the 3D representation system 170 of FIGS. 1 and 2. While the method 400 is discussed in combination with the 3D representation system 170, it should be appreciated that the method 400 is not limited to being implemented within the 3D representation system 170 but is instead one example of a system that may implement the method 400.

At 410, the region-of-interest module 225 receives an image 280 and one or more feature maps 285. The image 280 may be a 2D monocular image 280 and may have been captured by a camera associated with a vehicle 100. The image 280 may be associated with one or more feature map 285. The one or more feature maps 285 may have been generated by the feature module 223. Each feature map 285 may identify objects in the image 280, or may provide depth information for one or more pixels of the image 280.

At 420, the region-of-interest module 225 determines one or more regions-of-interest 287 in the image 280. The region-of-interest module 225 may determine the one or more regions-of-interest 287 in the image 280 based on the associated feature maps 285. Depending on the implementation, each region-of-interest may be associated with a ground truth box.

At 430, the lifting module 227 generates a 3D representation 291 for each region-of-interest 287. The lifting module 227 may generate each 3D representation 291 using a lifting function. Each 3D representation 291 may be an 8 point box and may have been generated by the lifting module 227 by calculating one or more of a height and width for the associated region-of-interest 287, a geometric center for the associated region-of-interest 287, a camera distance for the associated region-of-interest 287, and a rotation for the associated region-of-interest 287.

At 440, the loss module 229 calculates a loss 293 for one or more of the generated 3D representations 291. Depending on the embodiment, the loss module 229 may calculate the loss 293 for a generated 3D representation 291 by comparing the box generated at 430 with the ground truth box associated with the region-of-interest 287. The particular formula used by the loss module 229 is described above. Other methods of formulas for calculating the loss 293 may be used. Generally, the closer or more similar the generated box and the ground truth box, the smaller the calculated loss 293.

At 450, the lifting module 227 may train the lifting function using the losses 293 generated for each of the generated 3D representations 291. Any method or technique for training a function may be used.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the 3D representation system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the 3D representation system 170, and/or the autonomous driving module(s) 160 may control some or all of these vehicle systems 140 and, thus, may be partially or fully autonomous.

The processor(s) 110, the 3D representation system 170, and/or the autonomous driving module(s) 160 can be operatively connected to communicate with the various vehicle systems 140 and/or individual components thereof. For example, returning to FIG. 1, the processor(s) 110, the 3D representation system 170, and/or the autonomous driving module(s) 160 can be in communication to send and/or receive information from the various vehicle systems 140 to control the movement, speed, maneuvering, heading, direction, etc. of the vehicle 100. The processor(s) 110, the 3D representation system 170, and/or the autonomous driving module(s) 160 may control some or all of these vehicle systems 140.

The processor(s) 110, the 3D representation system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the 3D representation system 170, and/or the autonomous driving module(s) 160 can control the direction and/or speed of the vehicle 100. The processor(s) 110, the 3D representation system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the 3D representation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

What is claimed is:

1. A system for generating 3D representations from images comprising:
one or more processors;
a memory communicably coupled to the one or more processors and storing:
an image module including instructions that when executed by the one or more processors cause the one or more processors to:
capture an image;
a feature module including instructions that when executed by the one or more processors cause the one or more processors to:
generate one or more feature maps for the captured image;
a region-of-interest module including instructions that when executed by the one or more processors cause the one or more processors to:
determine one or more regions-of-interests in the captured image based in part on the one or more feature maps;
a lifting module including instructions that when executed by the one or more processors cause the one or more processors to:
for each region-of-interest, use a lifting function to generate a 3D representation based on the region-of-interest and the one or more feature maps; and
a loss module including instructions that when executed by the one or more processors cause the one or more processors to calculate a loss for the 3D representation as a mean over eight corner distances in metric space and train the lifting function using the calculated loss.

2. The system of claim 1, wherein each region-of-interest corresponds to a vehicle.

3. The system of claim 1, further comprising a training module including instructions that when executed by the one or more processors cause the one or more processors to: generate training data from the generated 3D representations.

4. The system of claim 1, wherein each 3D representation comprises a 3D box.

5. The system of claim 1, wherein generating a 3D representation based on the region-of-interest and the one or more feature maps comprises:
calculating a height and width for the region-of-interest from the one or more feature maps;
calculating a geometric center for the region-of-interest from the one or more feature maps;
calculating a camera distance for the region-of-interest from the one or more feature maps;
calculating a rotation for the region-of-interest from the one or more feature maps; and
generating the 3D representation of the region-of-interest from one or more of the calculated height and width, the calculated geometric center, the calculated camera distance, and the calculated rotation.

6. The system of claim 1, wherein the image is a 2D monocular image.

7. A method for generating 3D representations from images, the method comprising:
receiving an image and one or more feature maps for the image;
determining one or more regions-of-interest in the image based in part of the image and the one or more feature maps;
for each region-of-interest, generating a 3D representation based on the region-of-interest and the one or more feature maps using a lifting function;
calculating a loss for one or more of the generated 3D representations as a mean over eight corner distances in metric space; and
training the lifting function using the calculated loss.

8. The method of claim 7, wherein each region-of-interest corresponds to a vehicle.

9. The method of claim 7, further comprising generating training data from the generated 3D representations.

10. The method of claim 7, wherein each 3D representation comprises a 3D box.

11. The method of claim 7, wherein generating a 3D representation based on the region-of-interest and the one or more feature maps using the lifting function comprises:
calculating a height and width for the region-of-interest from the one or more feature maps;
calculating a geometric center for the region-of-interest from the one or more feature maps;
calculating a camera distance for the region-of-interest from the one or more feature maps;
calculating a rotation for the region-of-interest from the one or more feature maps; and
generating the 3D representation of the region-of-interest from one or more of the calculated height and width, the calculated geometric center, the calculated camera distance, and the calculated rotation.

12. The method of claim 7, wherein the image is a 2D monocular image.

13. A non-transitory computer-readable medium for generating 3D representations from images and including instructions that when executed by one or more processors cause the one or more processors to:
capture an image;
generate one or more feature maps for the captured image;
determine one or more regions-of-interest in the image based in part of the image and the one or more feature maps;
for each region-of-interest, generate a 3D representation based on the region-of-interest and the one or more feature maps using a lifting function;
calculate a loss for one or more of the generated 3D representations as a mean over eight corner distances in metric space; and
train the lifting function using the calculated loss.

14. The non-transitory computer-readable medium of claim 13, wherein each region-of-interest corresponds to a vehicle.

15. The non-transitory computer-readable medium of claim 13, wherein each 3D representation comprises a 3D box.

16. The non-transitory computer-readable medium of claim 13, wherein generating a 3D representation based on the region-of-interest and the one or more feature maps comprises:
calculating a height and width for the region-of-interest from the one or more feature maps;
calculating a geometric center for the region-of-interest from the one or more feature maps;
calculating a camera distance for the region-of-interest from the one or more feature maps;
calculating a rotation for the region-of-interest from the one or more feature maps; and
generating the 3D representation of the region-of-interest from one or more of the calculated height and width, the calculated geometric center, the calculated camera distance, and the calculated rotation.

17. The non-transitory computer-readable medium of claim 13, wherein the image is a 2D monocular image.

\* \* \* \* \*